United States Patent
Oerton

(10) Patent No.: US 9,451,634 B2
(45) Date of Patent: *Sep. 20, 2016

(54) METHOD OF LIMITING USE OF A MOBILE WIRELESS ACCESS POINT NEAR A WIRELESS LOCAL AREA NETWORK

(71) Applicant: BlackBerry Limited, Waterloo (CA)

(72) Inventor: Kevin John Oerton, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/921,765

(22) Filed: Oct. 23, 2015

(65) Prior Publication Data

US 2016/0044465 A1 Feb. 11, 2016

Related U.S. Application Data

(60) Division of application No. 14/498,522, filed on Sep. 26, 2014, now Pat. No. 9,241,344, which is a continuation of application No. 13/021,331, filed on Feb. 4, 2011, now Pat. No. 8,848,679.

(60) Provisional application No. 61/375,156, filed on Aug. 19, 2010.

(51) Int. Cl.
*H04W 74/00* (2009.01)
*H04W 4/02* (2009.01)
(Continued)

(52) U.S. Cl.
CPC ............ *H04W 74/002* (2013.01); *H04L 43/00* (2013.01); *H04W 4/025* (2013.01); *H04W 24/02* (2013.01); *H04W 72/12* (2013.01); *H04W 88/10* (2013.01); *H04W 92/20* (2013.01)

(58) Field of Classification Search
None
See application file for complete search history.

(56) References Cited

U.S. PATENT DOCUMENTS

| 7,353,533 B2 | 4/2008 | Wright et al. |
| 2004/0078598 A1 | 4/2004 | Barber et al. |

(Continued)

FOREIGN PATENT DOCUMENTS

| JP | 2010178210 A1 | 8/2010 |
| WO | 2007094183 A1 | 8/2007 |

OTHER PUBLICATIONS

Communication pursuant to Article 94(3) EPC dated Mar. 13, 2015, issued in respect of corresponding European Patent Application No. 11153347.7

(Continued)

*Primary Examiner* — Ashley Shivers
(74) *Attorney, Agent, or Firm* — Borden Ladner Gervais LLP; Todd Keeler

(57) ABSTRACT

To promote network security in a wireless local area network (WLAN), a mobile communication device, which is operable as a mobile wireless access point, may read a WLAN identifier that is known to be used by the WLAN and an indication of a channel on which a wireless access point of the WLAN is known to operate. The device may then monitor the channel for a transmission of the WLAN identifier. The mobile wireless access point may be configured to operate using the selected channel so that the monitoring occurs on the same channel as that on which the mobile wireless access point is operating. The transmission, if detected, may be considered to indicate that the mobile communication device is within the WLAN. Upon detecting the transmission, use of the WLAN identifier by the mobile wireless access point at the mobile communication device may be prevented, e.g. by requiring the mobile wireless access point to use a different WLAN identifier or by disabling the mobile wireless access point.

20 Claims, 5 Drawing Sheets

(51) Int. Cl.
*H04L 12/26* (2006.01)
*H04W 72/12* (2009.01)
*H04W 24/02* (2009.01)
*H04W 88/10* (2009.01)
*H04W 92/20* (2009.01)

(56) References Cited

U.S. PATENT DOCUMENTS

| | | |
|---|---|---|
| 2004/0166897 A1 | 8/2004 | Hamada |
| 2005/0070279 A1 | 3/2005 | Ginzburg et al. |
| 2009/0080388 A1 | 3/2009 | Rohfleisch et al. |
| 2009/0129291 A1 | 5/2009 | Gupta |
| 2009/0253392 A1 | 10/2009 | Colonna |
| 2009/0323644 A1 | 12/2009 | Yokota |
| 2009/0325566 A1 | 12/2009 | Bell et al. |
| 2010/0100930 A1 | 4/2010 | King |
| 2011/0039579 A1 | 2/2011 | Karjalainen |

OTHER PUBLICATIONS

Figiel, Barbara. Extended European Search Report dated Dec. 12, 2011, in relation to European Patent Application No. 11153347.7, 6 pages.

Scott, Anne-Marie. Examiner's Report dated Jul. 29, 2013 in relation to Canadian patent application No. 2,746,611, 3 pages.

Figiel, Barbara. Communication pursuant to Article 94(3) EPC dated Jan. 13, 2014, in relation to European Application No. 11153347.7, 6 pages.

Scott, Anne-Marie. Canadian Examiner's Report dated Apr. 22, 2014 in relation to Canadian patent application No. 2,746,611, 5 pages.

ARUBA Wireless Networks, Inc., Secure Wireless What Vendors Don't Tell You, California, U.S.A., published at least as early as Jul. 28, 2010.

3Com Corporation, Viiireless LANs: Assuring Enterprise Security and Identity Awareness, Massachusetts, U.S.A.; published at least as early as Jul. 28, 2010.

AirTight Netwoks The New Threat to Enterprise Security—Wi-Fi, California, U.S.A. published at least as early as Jul. 28, 2010.

ARUBA Networks, Inc, A Closer Look at Wireiss Intrusion Detection: How to Benefit from a Hybrid Deployment Model, California, U.S.A., published at least as early as Jul. 28, 2010.

Shivers, Ashley L. United States Office Action dated Aug. 16, 2013 in relation to U.S. Appl. No. 13/021,331, 23 pages.

Shivers, Ashley L. United States Office Action dated Feb. 20, 2014 in relation to U.S. Appl. No. 13/021,331, 24 pages.

Shivers, Ashley L. Unites States Notice of Allowance dated May 27, 2014 in relation to U.S. Appl. No. 13/021,331, 14 pages.

Extended European Search Report dated Jan. 19, 2016, issued in respect of corresponding European patent application No. 15168625.6.

METHOD OF LIMITING USE OF A MOBILE WIRELESS ACCESS POINT NEAR A WIRELESS LOCAL AREA NETWORK

CROSS-REFERENCE TO RELATED APPLICATIONS

This application is a divisional of U.S. patent application Ser. No. 14/498,522 filed Sep. 26, 2014, which is a continuation of U.S. patent application Ser. No. 13/021,331 filed Feb. 4, 2011, now U.S. Pat. No. 8,848,679 issued Sep. 30, 2014, which claims priority from U.S. Provisional Patent Application No. 61/375,156 filed Aug. 19, 2010, the contents of all of which are incorporated herein by reference.

FIELD OF TECHNOLOGY

The present disclosure pertains wireless local area networks (WLANs), and more particularly to the promotion of network security in WLANs.

BACKGROUND

In an enterprise environment, the use of unauthorized wireless access points (e.g. wireless access points that are not sanctioned or administered by a system administrator or information technology department of the enterprise) may be problematic, e.g. due to security concerns or possibly due to interference with deployed corporate WLANs. The advent of mobile wireless access point functionality in mobile communication devices, e.g. smart phones, PDAs, or the like, may exacerbate these problems, because such devices are often more easily introduced into the enterprise environment than their non-mobile device counterparts.

The problems alluded to above are not necessarily limited to enterprise environments.

BRIEF DESCRIPTION OF THE DRAWINGS

Reference will now be made, by way of example, to the accompanying drawings which show at least one example embodiment of the present application, wherein.

DETAILED DESCRIPTION

Figure 1:
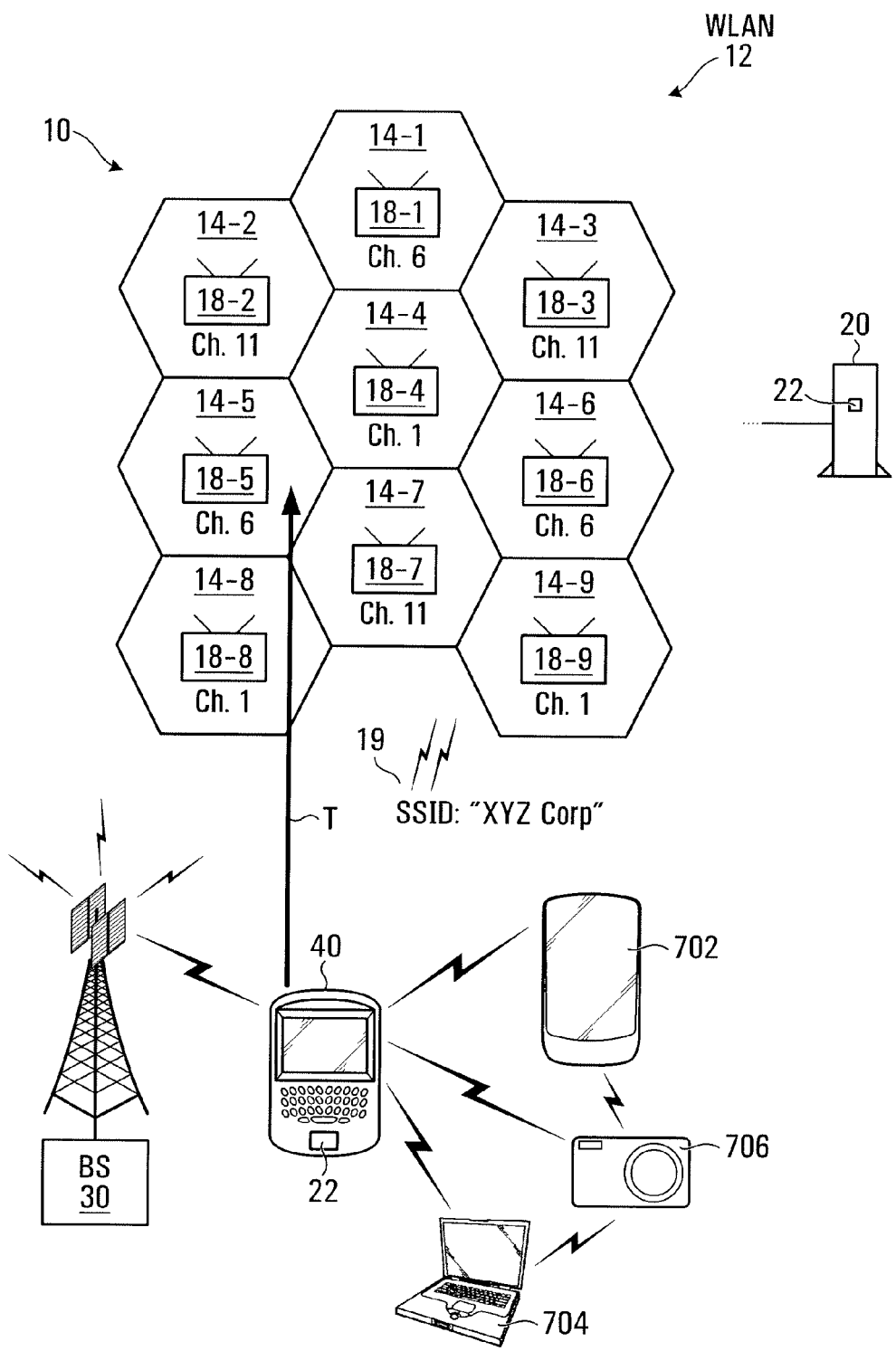
FIG. 1 is a schematic diagram of an exemplary system comprising a WLAN, a server, a base station and a mobile communication device.

In one aspect of the present disclosure, there is provided a mobile communication device comprising a processor and memory, the mobile communication device operable as a mobile wireless access point, the memory storing software that, upon execution by the processor, causes the processor to: read from the memory a wireless local area network (WLAN) identifier that is known to be used by a WLAN; read from the memory an indication of a channel on which a wireless access point of the WLAN is known to operate, the channel having an associated center frequency; monitor only the channel for a transmission of the WLAN identifier, the transmission, if detected, indicating that the mobile communication device is within the WLAN; and upon detection of the transmission, prevent the mobile wireless access point at the mobile communication device from using the WLAN identifier.

In some embodiments, there may be provided a device as described above wherein the preventing the mobile wireless access point at the mobile communication device from using the WLAN identifier comprises disabling the mobile wireless access point.

In some embodiments, there may be provided a device as described above wherein the preventing the mobile wireless access point at the mobile communication device from using the WLAN identifier comprises requiring the mobile wireless access point to use a different WLAN identifier.

In some embodiments, there may be provided a device as described above wherein the monitoring of only the channel on which the wireless access point of the WLAN is known to operate for the transmission of the WLAN identifier of the WLAN is conditional upon a determination that the mobile communication device is in motion.

In some embodiments, there may be provided a device as described above wherein the monitoring of only the channel on which the wireless access point of the WLAN is known to operate for the transmission of the WLAN identifier of the WLAN is conditional upon a determination that the mobile communication device is presently situated in a geographical location that is known to be proximate to the WLAN.

In some embodiments, there may be provided a device as described above wherein the channel is a first channel whose associated center frequency is within a frequency band and the software further causes the processor to: read from said memory an indication of at least one other channel that is known to be used by another wireless access point of said WLAN, the other channel having an associated center frequency within said frequency band that is different from the center frequency of the first channel; and selecting one of the channel and the other channel, the selecting resulting in a selected channel, wherein the monitoring is of the selected channel.

In some embodiments, there may be provided a device as described above further comprising, prior to the monitoring, configuring the mobile wireless access point functionality to operate using the selected channel.

In another aspect of the present disclosure, there is provided a method of promoting network security in a wireless local area network (WLAN) comprising multiple WLAN cells, each WLAN cell comprising a wireless access point, the method comprising: at a mobile communication device having a mobile wireless access point functionality: receiving an indication of a WLAN identifier to be used for identifying the WLAN; receiving an indication of a plurality of channels to be selectively used by individual ones of the wireless access points of the WLAN, each of the channels having a distinct center frequency; selecting a channel of the plurality, the selecting resulting in a selected channel; monitoring the selected channel for a transmission of the WLAN identifier, the transmission, if detected, indicating that the mobile communication device is within one of the WLAN cells; and upon detecting the transmission, preventing the mobile wireless access point functionality at the mobile communication device from using the WLAN identifier.

In some embodiments, there may be provided a method as described above wherein the preventing the mobile wireless access point functionality at the mobile communication device from using the WLAN identifier comprises deactivating the mobile wireless access point functionality at the mobile communication device.

In some embodiments, there may be provided a method as described above wherein the preventing the mobile wireless access point functionality at the mobile communication device from using the WLAN identifier comprises requiring the mobile wireless access point functionality to use a different WLAN identifier.

In some embodiments, there may be provided a method as described above further comprising, prior to the monitoring, configuring the mobile wireless access point functionality to operate using the selected channel and wherein said monitoring is only of the selected channel and not of any unselected channel.

In some embodiments, there may be provided a method as described above wherein the selecting is based, at least in part, on the identity of a channel on which the mobile wireless access point is already configured to operate.

In some embodiments, there may also be provided a method as described above wherein each of the wireless access points and the mobile wireless access point operate in accordance with an IEEE 802.11 standard and wherein the WLAN identifier is a service set identifier (SSID).

In another aspect of the present disclosure, there is provided a method of promoting network security in a wireless local area network (WLAN) comprising a wireless access point, the method comprising: at a mobile communication device having a mobile wireless access point functionality: receiving an indication of a WLAN identifier known to be used by the wireless access point for identifying the WLAN; receiving an indication of a channel known to be used by the wireless access point of the WLAN, the channel having an associated center frequency; monitoring only the indicated channel for a transmission of the WLAN identifier, the transmission, if detected, indicating that the mobile communication device is within the WLAN cell; and upon detecting the transmission, preventing the mobile wireless access point functionality from using the WLAN identifier at the mobile communication device.

In some embodiments, there may be provided a method as described above wherein the preventing the mobile wireless access point functionality at the mobile communication device from using the WLAN identifier comprises deactivating the mobile wireless access point functionality at the mobile communication device.

In some embodiments, there may be provided a method as described above wherein the preventing the mobile wireless access point functionality at the mobile communication device from using the WLAN identifier comprises requiring the mobile wireless access point functionality to use a different WLAN identifier.

In another aspect of the present disclosure, there is provided a machine-readable medium storing software that, upon execution by a processor of a mobile communication device that is operable as a mobile wireless access point, causes the mobile communication device to: read a wireless local area network (WLAN) identifier that is known to be used by a WLAN; read an indication of a channel on which a wireless access point of the WLAN is known to operate, the channel having an associated center frequency; monitor only the channel for a transmission of the WLAN identifier, the transmission, if detected, indicating that the mobile communication device is within the WLAN; and upon detection of the transmission, prevent the mobile wireless access point at the mobile communication device from using the WLAN identifier In some embodiments, there may be provided a medium as described above wherein the preventing the mobile wireless access point at the mobile communication device from using the WLAN identifier comprises disabling the mobile wireless access point.

In some embodiments, there may be provided a medium as described above wherein the preventing the mobile wireless access point at the mobile communication device from using the WLAN identifier comprises requiring the mobile wireless access point to use a different WLAN identifier.

In some embodiments, there may be provided a medium as described above wherein the monitoring of only the channel on which a wireless access point of the WLAN is known to operate for the transmission of the WLAN identifier of the WLAN is conditional upon a determination that the mobile communication device is in motion.

In some embodiments, there may be provided a medium as described above wherein the monitoring of only the channel on which a wireless access point of the WLAN is known to operate for the transmission of the WLAN identifier of the WLAN is conditional upon a determination that the mobile communication device is presently situated in a geographical location that is known to be proximate to the WLAN.

In some embodiments, there may be provided a medium as described above wherein the channel is a first channel whose associated center frequency is within a frequency band and wherein the software further causes the processor to: read from the memory an indication of at least one other channel that is known to be used by another wireless access point of the WLAN, the other channel having an associated center frequency within the frequency band that is different from the center frequency of the first channel; and selecting one of the channel and the other channel, the selecting resulting in a selected channel, wherein the monitoring is of the selected channel.

Referring to FIG. 1, an exemplary system 10 comprises a wireless local area network (WLAN) 12, a server 20, a base station 30 and a mobile communication device 40.

WLAN 12 is a wireless local area network comprising nine cells 14-1, 14-2, 14-3, 14-4, 14-5, 14-6, 14-7, 14-8 and 14-9, referred to collectively or generically as cell(s) 14. Each cell 14 comprises a respective wireless access point 18-1, 18-2, 18-3, 18-4, 18-5, 18-6, 18-7, 18-8 and 18-9, referred to collectively or generically as wireless access point(s) 18 (or simply "access point(s)" 18). Each wireless access point 18 facilitates wireless data communication between proximate wireless devices and the WLAN 12. In the present example, the wireless access points 18 each implement a wireless communication protocol in accordance with the known IEEE 802.11n standard. This protocol may be referred to as Wi-Fi™, which is a term that may be applied to any type of 802.11 standard network (e.g. 802.11a, 802.11b, 802.11g, 802.11n etc.).

In the illustrated example, the WLAN 12 is physically located at the premises of an enterprise, which may be a corporation, business, government agency or other organization or entity. As such, the WLAN 12 may be referred to as an enterprise WLAN. Similarly, the WLAN cells 14 and wireless access points 18 may be referred to as enterprise WLAN cells 14 and enterprise wireless access points 18, respectively.

Each wireless access point 18 of WLAN 12 is configured, e.g. by a system administrator, to operate on a particular channel within a predetermined frequency range. In the present embodiment, the frequency range is a 2.4 GHz frequency band that is divided into eleven channels, as shown in Table 1 below. The frequency range and/or channels that are available for use by the wireless access points 18 may differ in other embodiments and may be governed by one or more applicable standards and/or government regulations in a relevant geographical region.

TABLE 1

Channel Center Frequencies

| Channel | Center Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |

As shown in Table 1, each channel has an associated center frequency. The center frequencies of adjacent channels are separated by 5 MHz in the frequency spectrum. Yet it is estimated that the frequency span of each channel is approximately 22 MHz. As such, adjacent channels overlap within the frequency spectrum. If two access points that are physically proximate one another were to use channels that are either immediately adjacent to, or insufficiently spaced from, one another within the frequency band (e.g. less than five channels apart within the spectrum), undesirable "adjacent channel interference" may occur. Similarly, if two wireless access points that are physically proximate one another were to use the same channel, undesirable "co-channel interference" may occur.

To guard against these forms of interference, each of the wireless access points 18 of FIG. 1 is configured to use only one of channels 1, 6 and 11. These three channels are referred to as "minimum interference channels" because their inter-channel spacing in the frequency domain is generally sufficient to avoid adjacent channel interference in most cases. Moreover, the wireless access points 18 of FIG. 1 are configured to avoid use of the same channel in any two physically adjacent WLAN cells 14, in order to limit the risk of co-channel interference. The resulting channel assignments are shown in FIG. 1, where the channel assigned to (i.e. used by) each respective wireless access point 18 is indicated immediately below it within the respective WLAN cell 14.

As is conventional, each wireless access point 18 is configured, e.g. by a system administrator, with an WLAN identifier that is used to identify the enterprise WLAN 12. That is, the WLAN identifier is broadcast or otherwise transmitted to proximate wireless devices so that the devices may detect the presence of the enterprise WLAN 12. In the case of Wi-Fi™, the WLAN identifier is a sequence up to 32 characters that is referred to as a Service Set Identifier (SSID). For example, in FIG. 1 an exemplary SSID 19, "XYZCorp", is used by each wireless access point 18 to identify the WLAN 12 to any proximate wireless devices. Each wireless access point of WLAN 12 is accordingly configured with the same value of SSID 19 (i.e. "XYZ-Corp"). Each wireless access point 18 may be selectively configured, e.g. by a system administrator, to either periodically broadcast the SSID 19 or to transmit the SSID 19 only in response to active scanning by a proximate wireless device, as desired.

Server 20 is a computing device having at least one processor interconnected with volatile and non-volatile memory. The server 20 may for example have a primary function of executing collaborative software or executing middleware software effecting automatic synchronization of users' collaborative software records (e.g. email, appointments and the like) with client mobile communication devices, such as mobile communication device 40 (described below), e.g. according to a "push" content delivery model. The primary function of the server 20 may differ in different embodiments and is not of central importance. It is sufficient to appreciate that the server 20 is capable of downloading a file, or otherwise communicating data, to the mobile communication device 40.

The server 20 stores an WLAN security configuration file 22 within its volatile or non-volatile memory. As shown in FIG. 1, this file is loaded into the memory of employees' enterprise mobile communication devices, such as mobile communication device 40, e.g. by a system administrator. The contents of this file 22 are described in more detail below.

Base station 30 is a conventional cellular telephony base station comprising a transmitter and receiver for transmitting and receiving voice and data to and from mobile communication devices (e.g. cellular telephones) operating within a particular geographical area. The data communications may for example conform to any of a number of mobile data communication network protocols such as Mobitex™, DataTAC™, Code Division Multiple Access (CDMA) or CDMA2000, Global System for Mobile Communications (GSM)/General Packet Radio Service (GPRS), third-generation (3G) protocols like EDGE, High Speed Packet Access (HSPA), HSPA+, Evolution-Data Optimized (EVDO) and Universal Mobile Telecommunications System (UMTS), or fourth-generation (4G) protocols such as Long Term Evolution (LTE), LTE Advanced and WiMax. The geographical area, which is also referred to as a "cellular telephony cell" or simply "cell" (not to be confused with a WLAN cell 14), is presumed to include the geographical area in which the enterprise WLAN 12 of FIG. 1 is situated. Accordingly, a mobile communication device in Wi-Fi™ data communication with one of the wireless access points 18 in a respective WLAN cell 14 can simultaneously be in cellular data communication with the base station 30 of the associated cellular telephony cell (not expressly illustrated).

The mobile communication device 40 is an electronic device capable of data, and possibly voice, communication. In the illustrated example, it is presumed that the device 40 has been issued to an employee of the enterprise at whose premises the WLAN 12 is physically located. The device 40 may for example be a two-way pager, personal digital assistant (PDA), smart phone, laptop computer, palmtop computer, or other form of communication or computing device. An exemplary mobile communication device 40 is illustrated greater detail in FIG. 2.

Figure 2:
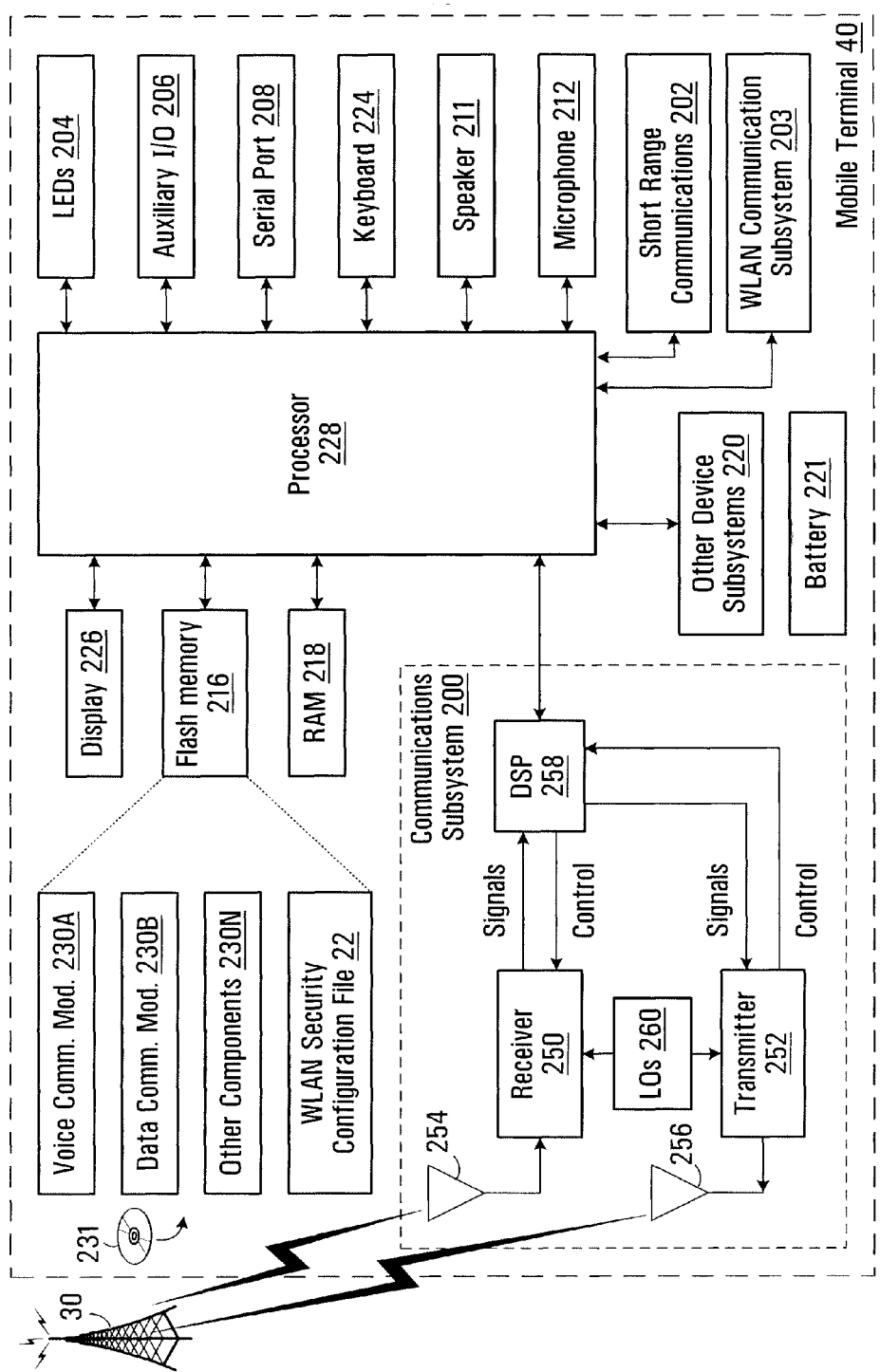
FIG. 2 is a schematic diagram illustrating the mobile communication device of FIG. 1 in greater detail.

Referring to FIG. 2, the mobile communication device 40 includes a housing, an input device (a keyboard 224), and an output device (a display 226), which may be a full graphic Liquid Crystal Display (LCD). Other types of output devices may alternatively be utilized. A processing device (a microprocessor 228, also referred to simply as processor 228) is shown schematically in FIG. 2 as coupled between the keyboard 224 and the display 226. The processor 228 controls the operation of the display 226, as well as the overall operation of the mobile communication device 40, in response to actuation of keys on the keyboard 224 by a user.

The housing may be elongated vertically, or may take on other sizes and shapes including clamshell housing structures. The keyboard may include a mode selection key, or other hardware or software for switching between text entry and telephony entry.

In addition to the processor 228, other parts of the mobile communication device 40 are shown schematically in FIG. 2. These include: a communications subsystem 200; a short-range communications subsystem 202; a WLAN communication subsystem 203; the keyboard 224 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The mobile communication device 40 may have a battery 221 to power the active elements of the mobile communication device 40. The mobile communication device 40 may be a two-way radio frequency (RF) communication device having voice and data communication capabilities. In addition, the mobile communication device 40 has the capability to communicate with other computer systems via the Internet.

Operating system software executed by the processor 228 may be stored in a persistent store, such as the flash memory 216, but may be stored in other types of memory devices, such as a read only memory (ROM) or similar storage element. The processor 228, executing the operating system software, effects basic operation of the mobile communication device 40, in part responsively to actuation of one or more user input mechanisms such as a keyboard, trackball, touchscreen or the like.

In addition to performing its operating system functions, the processor 228 enables execution of software applications on the mobile communication device 40. A predetermined set of software applications in memory 216 control basic device operations, such as a voice communications module 230A and a data communications module 230B. In addition, various other software and/or data components 230N may be stored in memory 216. Furthermore, the above-noted WLAN security configuration file 22, which is described in more detail below, may also be stored in memory 216 in some embodiments. The software and data may be loaded into a volatile store, such as the RAM 218, during execution by processor 228. The software and data components, as well as other components such as software or firmware elements of the WLAN communication subsystem 203, may be loaded from a machine-readable medium 231, which may be an optical disk, magnetic storage medium, read only memory or the like, during manufacture or subsequently, either through a wired connection with the mobile communication device 40 or over the air. The processor 228 executes applications or other software as configured or instructed by the user of device 40, as indicated below.

Communication functions, including data and voice communications, are performed through the communication subsystem 200, and possibly through the short-range communications subsystem 202 and/or WLAN communication subsystem 203. The communication subsystem 200 includes a receiver 250, a transmitter 252 and one or more antennas, illustrated as a receive antenna 254 and a transmit antenna 256. In addition, the communication subsystem 200 also includes a processing module, such as a digital signal processor (DSP) 258, and local oscillators (LOs) 260. The specific design and implementation of the communication subsystem 200 is dependent upon the communication network in which the mobile communication device 40 is intended to operate. For example, the communication subsystem 200 of the mobile communication device 40 may be designed to operate with the above-noted Mobitex™, DataTAC™ or GPRS mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile communication device 40.

Network access requirements of the mobile communication device 40 of FIG. 2 may vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile communication device 40 may send and receive communication signals over a wireless connection to the base station 14. Signals received from the base station 14 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals for transmission over the wireless connection to the base station 14 are processed (e.g., modulated and encoded) by the DSP 258 and are then provided to the transmitter 252 for digital to analog conversion, frequency up conversion, filtering, amplification and transmission over the wireless connection to the base station 14 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 200 and is input to the processor 228. The received signal is then further processed by the processor 228 for an output to the display 226, or alternatively to some other auxiliary I/O devices 206. A device user may also compose data items, such as e-mail messages, using the keyboard 224 and/or some other auxiliary I/O terminal 266, such as a touchpad, a rocker switch, a thumbwheel, or some other type of input device. The composed data items may then be transmitted over the wireless connection to the base station 14 via the communication subsystem 200.

In a voice communication mode, overall operation of the device is substantially similar to the data communication mode, except that received signals are output to a speaker 211, and signals for transmission are generated by a microphone 212. Alternative voice or audio I/O subsystems, such as a voice message recording subsystem, may also be implemented on the terminal 16. In addition, the display 226 may also be utilized in voice communication mode, for example, to display the identity of a calling party, the duration of a voice call, or other voice call related information.

The short-range communications subsystem 202 enables communication between the mobile communication device 40 and other proximate systems or devices, which need not necessarily be similar devices. For example, the short-range communications subsystem may include an infrared device and associated circuits and components, or a Bluetooth™ communication module to provide for communication with similarly-enabled systems and devices.

The WLAN communication subsystem 203 comprises hardware, software and/or firmware for facilitating two way data communications with a WLAN. The hardware may include an RF transmitter and receiver as well as a digital signal processor for example. The software may support two alternative modes of operation of the subsystem 203, namely a "client mode" and an "access point mode." In the client mode, the mobile communication device 40 can be associated (i.e. can establish an Open Systems Interconnection (OSI) Reference Model layer 2 data link connection) with a nearby wireless access point such as one of the wireless access points 18. In the access point mode, the device 40 provides mobile wireless access point functionality, i.e. acts as a mobile wireless access point, allowing nearby Wi-Fi™ enabled devices ("clients") to associate with the device 40. In access point mode, the device 40 intercommunicates with proximate client wireless devices via Wi-Fi™ and then converts the Wi-Fi™ signals to corresponding cellular data network signals, e.g. via communications subsystem 200, to be communicated to a proximate base station such as base station 30 (FIG. 1). Communications in the opposite directed are also supported.

For example, the communication device 40 may operate as an access point or router for a number of proximate client devices configured to communicate via Wi-Fi™ with the communication device 40. Alternatively, the communication device 40 and one or more other communication or data processing devices may be configured to automatically set up an ad hoc network, for example using the Wi-Fi™ Direct or another suitable protocol. Referring to FIG. 1, an exemplary Wi-Fi™-enabled tablet 702, laptop computer 704, and camera 706 are shown, each communicating via Wi-Fi™ with the communication device 40 over a wireless link. These devices 702, 704, 706 may be operable to enter into ad hoc networks with each other, as reflected by the additional wireless links in FIG. 1.

The subsystem 203 (FIG. 2) incorporates WLAN security logic, e.g. in the form of software and/or firmware comprising executable instructions, which limits the availability of the mobile wireless access point functionality in situations wherein the network security of the enterprise could be compromised, as described below. The WLAN security logic may be governed in part by the content of the WLAN security configuration file 22. The file 22 may reside in memory 21, as shown in FIG. 2. Alternatively, the file 22 may be considered to form part of subsystem 203. The WLAN security logic is described in more detail below.

Figure 3:
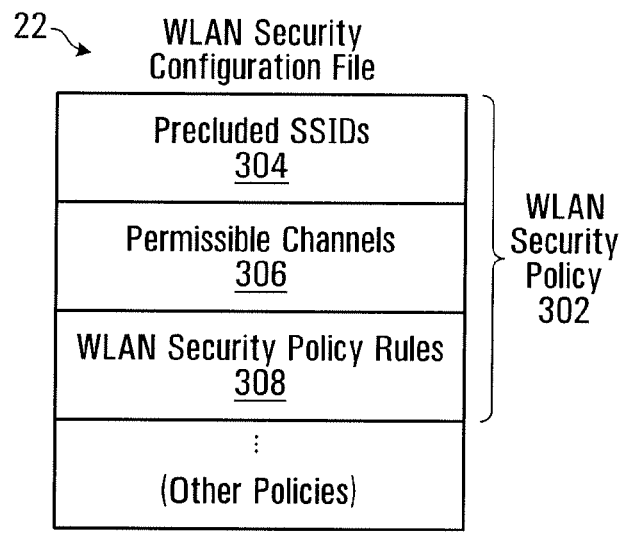
FIG. 3 is a schematic diagram illustrating the content of an exemplary WLAN security configuration file as may be stored at the server of FIG. 1.

FIG. 3 illustrates the content of an exemplary WLAN security configuration file 22 in greater detail. As illustrated, the file 22 contains a WLAN security policy 302 comprising set of precluded SSIDs 304, a set of permissible channels 306 and a set of WLAN security policy rules 308. Other policies could additionally be contained within the file 22, e.g. for different offices or different geographical locations of the enterprise.

The set of precluded SSIDs 304 enumerates one or more SSIDs that the mobile communication device 40 should refrain from using in conjunction with its mobile wireless access point functionality. The SSIDs are precluded because they are already being used by the wireless access points of the WLAN 12 to for the purpose of identifying the WLAN 12 to any proximate wireless devices. As such, use of the same SSIDs by the mobile wireless access point may lead to confusion as to whether or not the device 40 forms part of WLAN 12. In the present example, the SSIDs 304 include the exemplary SSID 19 "XYZCorp", as described above, as well as another SSID, "enterprise", that may be used by a subset of the wireless access points 18 of FIG. 1. For each SSID in the set, an indication of whether the SSID is to be periodically broadcast, versus being transmitted only in response to active scanning, may also be provided within the file 22.

The set of permissible channels 306 identifies the channels of Table 1 that are available for use by the mobile communication device 40 for its mobile wireless access point functionality. In the present embodiment, the permissible channels 306 include only those channels that are currently being used by at least one of the wireless access points 18 of the WLAN 12. For example, based on the illustrated use of channels 1, 6 and 11 in the various WLAN cells 14 of FIG. 1, the set of permissible channels 306 may be 1, 6 and 11. As will become apparent, the reason for deeming the same channels that are already being used in the enterprise WLAN 12 as permissible for use by the mobile wireless access point functionality may to support the ability of the mobile communication device 40 to perform periodic checking for a proximate enterprise WLAN cell 14 even when the mobile wireless access point is operational.

The set of WLAN security policy rules 308 identifies the currently operative WLAN security policy for the mobile communication device 40. In the present embodiment, one of three WLAN security policy rules may be specified in the set 308. Other embodiments may specify additional or different rules.

A first policy rule ("Rule I") that may be specified within the set of rules 308 is that the mobile wireless access point functionality is precluded from using any of the SSIDs in the set of precluded SSIDs 304. The rationale for preventing a mobile wireless access point from using the precluded SSIDs is to prevent wireless devices within the enterprise from mistaking the mobile wireless access point of the mobile communication device 40 for one of the enterprise wireless access points 18 of the enterprise WLAN 12. Intentionally seeking to cause such mistakes, possibly with malicious intent, may be referred to as a "spoofing" a wireless access point 18, and is often undesirable. If the mobile wireless access point were to spoof one of the wireless access points 18, and if the security settings of the mobile wireless access point are weaker than those of the WLAN 12, then security of the WLAN 12, as well as the enterprise generally, may be compromised. Another possible disadvantage may be performance degradation resulting from interference between an enterprise WLAN access point and the mobile wireless access point. Note that Rule I does not necessarily preclude use of the mobile wireless access point functionality with another SSID, although some embodiments may elect to completely deactivate the mobile wireless access point functionality for maximum security.

A second policy rule ("Rule II") that may be specified within the set of rules 308 is that activation of the mobile wireless access point is precluded when the mobile communication device 40 is within a WLAN cell 14 whose wireless access point 18 is using one of the precluded SSIDs of set 304. Rule II specifically pertains to situations in which the mobile wireless access point of the mobile communication device 40 is inactive when the precluded SSID is detected (i.e. situations in which the WLAN communication subsystem 203 is not in access point mode when it is the device 40 is found to be within a WLAN cell 14).

A third policy rule ("Rule III") that may be specified within the set of rules 308 is that the mobile wireless access point shall become deactivated (i.e. should be turned off) when it is determined that the mobile communication device 40 enters an enterprise WLAN cell 14. Rule III pertains to situations in which the mobile wireless access point is already active when the precluded SSID is detected.

A brief description of the operation of the WLAN security logic of the WLAN communication subsystem 203, and more generally, of the mobile communication device 40, for enforcing each of the above Rules I-III is provided below in conjunction with the flowcharts of FIGS. 4-6 respectively. In each example, it is presumed that the WLAN security configuration file 22 that is maintained at server 20 (FIG. 1) has been downloaded to the mobile communication device 40 (FIG. 2). The download may have been orchestrated by a system administrator, for example, and may occur periodically in the context of regular security policy updates. Such updates may be used by enterprises to enforce various security policies, such as minimum password lengths, password lock out, data encryption, and the like. Each update may entail downloading one or more security policy files to each mobile communication device assigned to an employee, which file(s) dictate permissible manners of operation of the devices. It is also presumed that the set of precluded SSIDs 304 specified in file 22 is as indicated above (i.e. the set contains the SSIDs "XYZCorp" and "enterprise") and that both SSIDs are indicated as being broadcast rather than requiring active scanning. It is further presumed that set of permissible channels 306 specified in the file 22 indicates three channels, namely channels 1, 6 and 11. It is still further presumed that the mobile communication device 40 has determined the operative rule from the set of rules 308 of file 22.

Figure 4:
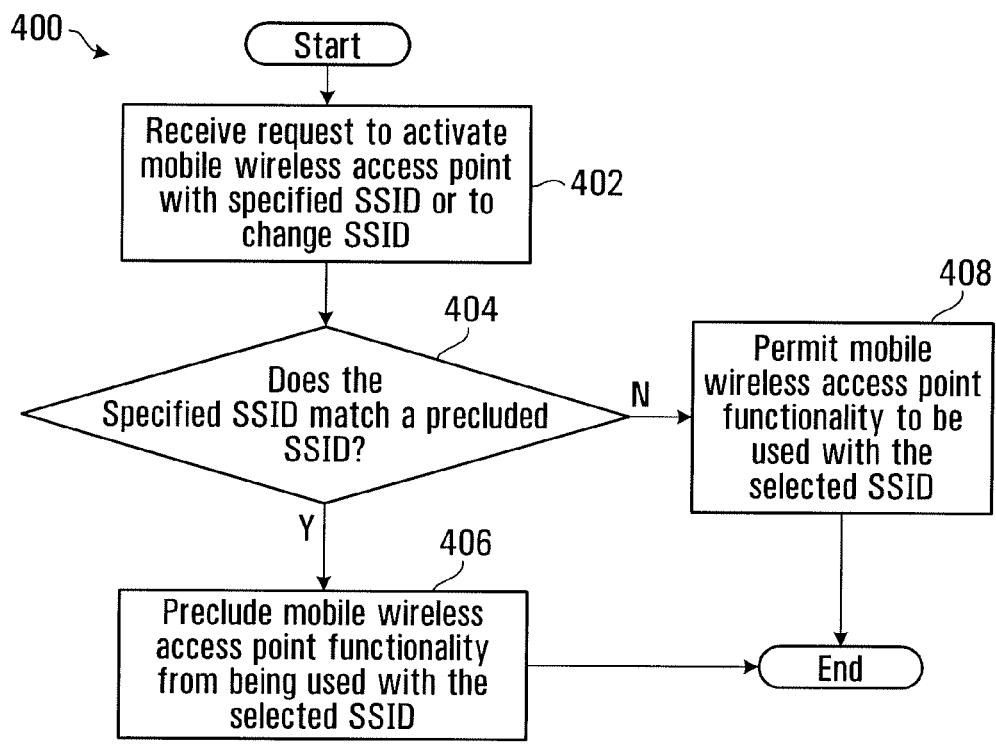
FIGS. 4 to 6 are flowcharts illustrating exemplary operation of the mobile communication device of FIG. 1.

Referring to FIG. 4, operation 400 of the mobile communication device 40 is illustrated in an exemplary embodiment wherein the WLAN security policy rules 308 identify Rule I as the currently operative rule. Operation 400 may comprise part of the WLAN security logic within WLAN communication subsystem 203 (FIG. 2). Initially, a request to either activate the mobile wireless access point functionality (e.g. set the mode of the WLAN communication subsystem to "access point mode") using a specified SSID, or to change the SSID of the already activated mobile wireless access point functionality to use a specified SSID, is received (FIG. 4, 402). This request may originate from a user of the mobile communication device 40, e.g. by way of keyboard or touchscreen input. The specified SSID is thereafter compared to the each of the SSIDs in the set of precluded 304 SSIDs (404). If there is a match, then the mobile communication device is precluded from using the mobile wireless access point functionality with the specified SSID (406). This may entail precluding use of the mobile wireless access point altogether at device 40 (e.g. disabling the mobile wireless access point functionality wholesale), or simply preventing use of the specified SSID while allowing the mobile wireless access point functionality to be used with another SSID that is not in the set of precluded SSIDs 304 (i.e. disabling the mobile wireless access point functionality for the specified SSID but not necessarily for all SSIDs). Thus if an activation request had been received in 402, then activation using a non-precluded SSID may occur in 406. If, on the other hand, a request change the SSID of the already activated mobile wireless access point functionality to use a precluded SSID had been received in 402, the request would be denied in 406.

If there is no match, then it is permitted to use the mobile wireless access point functionality with the specified SSID (408). Thus if an activation request had been received in 402, then activation using the specified SSID may occur in 408. For example, the access point mode of the WLAN communication subsystem 203, described above, may be activated using that SSID. If, on the other hand, a request to change the SSID of an already activated mobile wireless access point functionality had been received in 402, then the SSID could be changed to the specified SSID in 408.

Figure 5:
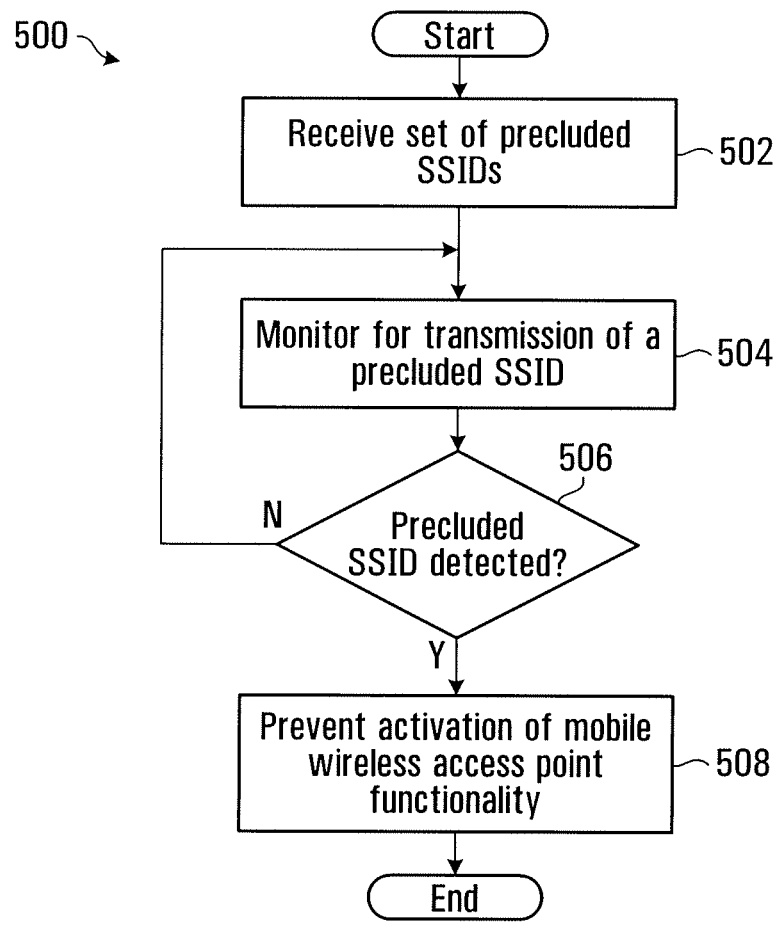

FIG. 5 illustrates operation 500 of the mobile communication device 40 when Rule II is indicated as the currently operative rule in the WLAN security policy rules 308. Operation 500 may comprise part of the WLAN security logic within WLAN communication subsystem 203 (FIG. 2). Operation 500 presumes that the mobile wireless access point functionality of the mobile communication device 40 is initially inactive (e.g. WLAN communication subsystem 203 is not in access point mode). As noted above, the set of precluded SSIDs 304 (FIG. 3) is received (FIG. 5, 502), e.g. by having been read from the previously downloaded or installed file 22, which may be resident in memory 216 (as illustrated in FIG. 2) or in memory 218. Thereafter, the mobile communication device 40 monitors for transmission of precluded SSID (504). Because mobile wireless access point functionality is not active, the monitoring is not necessarily limited to any particular channel or set of channels of Table 1. By scanning various channels, the mobile communication device may be more adept at detecting the enterprise WLAN, say, upon activation of a new WLAN cell 14 that uses a previously unused channel. In contrast, by limiting scanning to only one or more of the permissible channels of set 306, it may be possible to limit the burden on mobile communication device resources, such as processor 228 and battery 221 (FIG. 2), when scanning for precluded SSIDs, at the possible expense of detection speed and/or robustness.

In the present example, in which both of the precluded SSIDs are known to be broadcast, the mobile communication device 40 passively monitors channels 1, 6 and 11 (FIG. 5, 504). If either of the precluded SSIDs were not broadcast, the mobile communication device may actively scan for that precluded SSID, i.e. in may actively solicit transmission of SSIDs. If none of the precluded SSIDs is detected (506), then operation 504 and 506 is periodically repeated, e.g. at regular intervals. Upon detection of a precluded SSID, the mobile communication device is configured to prevent activation of the mobile wireless access point functionality (508). The latter may entail changing a configuration setting forming part of, or otherwise being associated with, the WLAN communication subsystem 203 (FIG. 2) for example.

Figure 6:
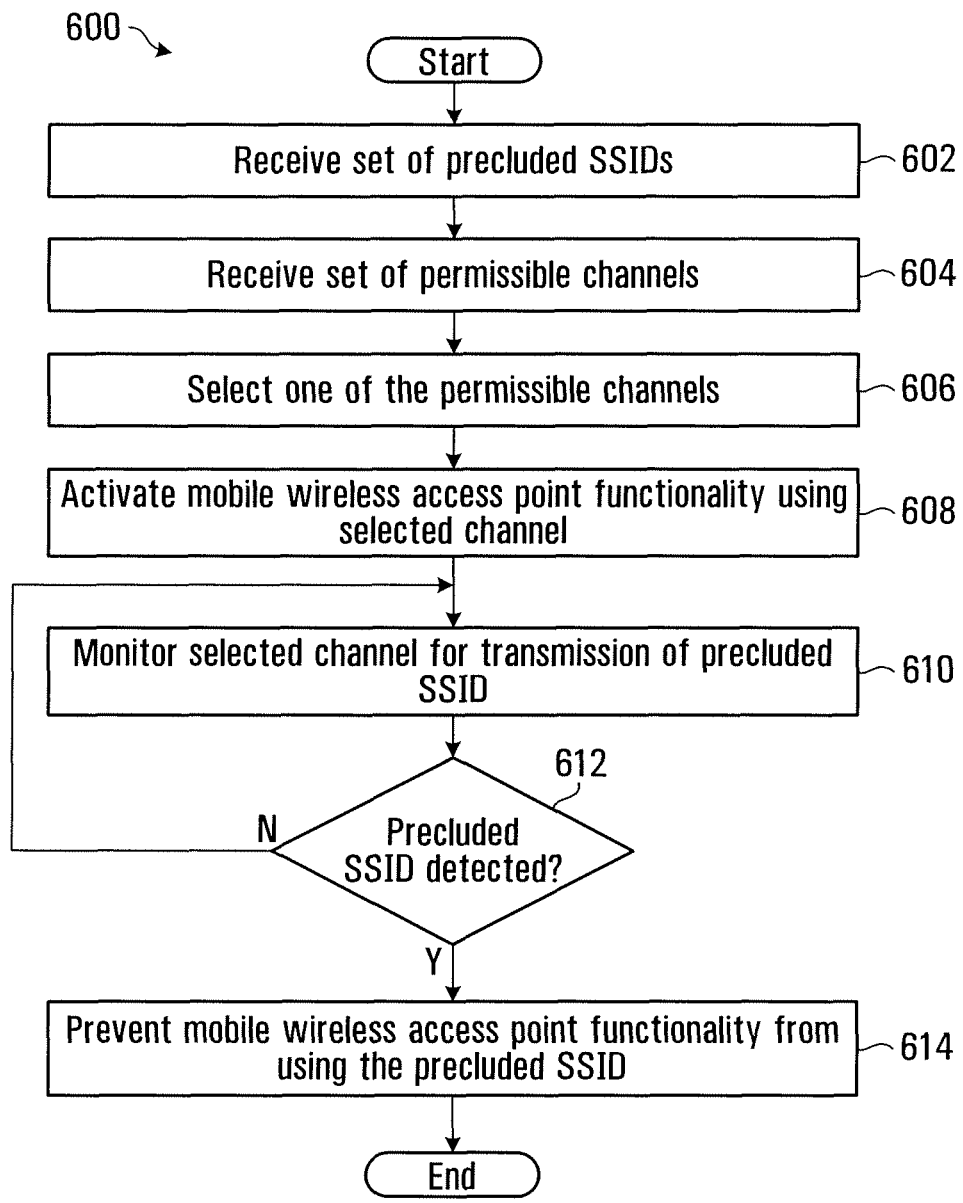

FIG. 6 illustrates operation 600 of mobile communication device 40 for effecting Rule III, described above. Operation 600 may comprise part of the WLAN security logic within WLAN communication subsystem 203. As previously noted, it is presumed that the set of precluded SSIDs 304 and the set of permissible channels 306, whose values are indicated above, have been received (FIGS. 6, 602 and 604), e.g. via download or pre-installation of the WLAN security configuration file 22 of FIG. 3. As such, the precluded SSIDs and the permissible channels are read from memory 216 or 218 at the mobile communication device.

Thereafter, one of the permissible channels of set 306 is selected (FIG. 6, 606), e.g. via user selection at the mobile communication device 40 or automatically, and the mobile wireless access point functionality is activated using that channel or configured to operate using that channel (608). One scheme for selection of a permissible channel of multiple permissible channels may be to check whether the permissible channels include a channel on which the mobile wireless access point is already configured to operate (presuming it is already operational) and to select that channel. This may avoid any delay and possible power expenditure associated with changing the channel that the mobile wireless access point is configured to use. The selection of a permissible channel may be based on that factor and/or possibly other factors.

The rationale for activating the mobile wireless access point functionality using a "permissible channel" that is already being used by one or more enterprise WLAN wireless access points is to increase the likelihood of successfully detecting the presence of the enterprise WLAN. On its face, this may appear illogical or counterintuitive, when it is considered that interference between the mobile wireless access point and the enterprise wireless access points might occur, possibly to the detriment of the smooth operation of the mobile wireless access point. However, because it may only be possible (at least in some embodiments) to scan the same channel as is currently being used to provide the mobile wireless access point functionality, e.g. in order to ensure than any incoming communication requests from associated clients are not missed, using that channel may be considered an acceptable solution for detecting the enterprise WLAN 12 even though some flexibility (in terms of mobile wireless access point functionality) may be lost.

The following example may be considered illustrative of this point. Assume that the mobile communication device 40 has elected to use channel 6 for its mobile wireless access point functionality. As noted earlier, channel 6 is one of the three channels that are selectively used by individual wireless access points 18 of the enterprise WLAN 12 that is illustrated in FIG. 1. Assume further that the mobile communication device 40 physically moves through the enterprise WLAN 12, e.g. by virtue of being carried by its user, along the physical trajectory T illustrated in FIG. 1. The trajectory T leads the device 40 to pass through WLAN cells 14-8, 14-7 and 14-5, in that order. Because the mobile wireless access point is operating on channel 6, and because the exemplary mobile communication device 40 in this example can only monitor the same channel as is being used for the mobile wireless access point, the mobile communication device 40 is unable to monitor the channels 1 and 11 of WLAN cells 14-8 and 14-7 (respectively) as the device 40 passes through those cells. However, the device 40 is able to monitor channel 6 of WLAN cell 14-5. Accordingly, the presence of the enterprise WLAN 12 will be detected when the device 40 enters WLAN cell 14-5.

More specifically, and with reference to FIG. 6, the mobile communication device 40 monitors only the selected channel, and not any of the unselected channels, for transmission a precluded SSID (610). If the SSID is not detected (612), operation 610 and 612 is periodically repeated, e.g. at regular intervals. Further to the example above, execution of 610 and 612 as the device 40 passes through WLAN cells 14-8 and 14-7 along trajectory T would not lead to detection of the precluded SSID, which is being transmitted (here, broadcast) on channels 1 and 11 respectively in those cells. However, upon entry of the device 40 into WLAN cell 14-5, which is using the same channel that is being monitored in operation 610 (i.e. channel 6), then the operation at 610 and 612 will be successful in detecting the precluded SSID "XYZCorp". In that case, the mobile wireless access point functionality is prevented from using the WLAN identifier at the mobile communication device (614), e.g. by deactivating the mobile wireless access point entirely or by requiring the mobile wireless access point to use an SSID that is not in the set of precluded SSIDs 304.

The above embodiments are described in connection with wireless access points (both fixed and mobile) that employ Wi-Fi™. It will be appreciated that alternative embodiments may employ enterprise wireless access points and mobile wireless access points that utilize other wireless communication protocols. In such other protocols, WLAN identifiers may not necessarily be referred to as SSIDs.

In some embodiments, the operation illustrated in FIGS. 5 and 6, particularly beginning at 504 in FIGS. 5 and 610 in FIG. 6, may be conditional upon a determination that the mobile communication device 40 is in motion. Such a determination may be made using a Global Positioning System (GPS) receiver, an accelerometer or another type of motion detection sensor that may be resident at the device 40, e.g. within device subsystems 220 (FIG. 2). The rationale for this approach may be to avoid unnecessarily checking for the detection of a proximate enterprise WLAN when the device 40 is initially known to be in a location where the enterprise WLAN has not been detected and the device is not moving. This approach may for example avoid unnecessarily consuming power or processor resources of the mobile communication device 40.

Similarly, in some embodiments, the operation illustrated in FIGS. 5 and 6, particularly beginning at 504 in FIGS. 5 and 610 in FIG. 6, may be conditional upon a determination that the mobile communication device 40 is presently in a geographical location that is known to be proximate to the enterprise WLAN. Such a determination may be made using a GPS receiver for example. The rationale for this approach may be to avoid unnecessarily checking for the detection of a proximate enterprise WLAN when the device 40 is known to be in a location that is not proximate to the enterprise WLAN. Again, this may avoid unnecessarily consuming power or processor resources of the mobile communication device 40.

The above embodiments describe an enterprise WLAN that contains multiple WLAN cells. A similar approach may be used for enterprise WLANs comprising only one WLAN cell. For example, the operation 600 may differ from what is illustrated in FIG. 6 in that only one channel—the one that is being used by the sole WLAN cell of the WLAN—may be indicated as a "permissible channel." This channel would then necessarily be the "selected channel."

In some embodiments, the security policies such as policy 302 of FIG. 3 (or any of its components) can be pre-programmed into firmware or memory elements of the mobile communication device 40.

In some embodiments, the WLAN security configuration file 22 may contain multiple security policies 302. It may be possible to configure the mobile communication device 40 to adopt different ones of the security policies at different times or in different geographical locations. Moreover, it is not necessarily true that only one rule of a security policy is operative at one time. In some embodiments, two or more rules of a security policy may be operative at the same time, e.g. if they are not incompatible with one another.

The above disclosure describes methods and devices for limiting use of a mobile wireless access point near an enterprise WLAN. It will be appreciated that these methods could be applied to any WLAN, whether or not the WLAN is associated with an enterprise.

Various forms of WLAN identifiers may be used in different embodiments. While the above examples use an exemplary WLAN identifier that is an SSID, in some embodiments the WLAN identifier may be a Basic Service Set Identifier (BSSID), which is a Media Access Control (MAC) address of a wireless access point. In other embodiments, the WLAN identifier may be a Homogeneous Extended Service Set Identifier (HESSID). The HESSID may be an SSID associated with a particular access point and a network identification corresponding to a supported subscription service provider network (SSPN). HESSIDs are described in more detail in the IEEE 802.11U draft standard.

In some embodiments, the mobile wireless access point may be precluded from using any channel that is not indicated in the set of permissible channels 306.

It will be appreciated that references to "software" herein are inclusive of firmware, which may be considered a form of software stored in a memory, such as a read-only memory.

It will be appreciated that, in an alternative embodiment, the file 22 could comprise multiple files or one or more other forms, types, packages or units of data (e.g. database records, markup language, or the like).

The above disclosure is not intended to represent the only embodiments that may be practiced.

Appendix A provides an alternative description of portions of the above disclosure.

APPENDIX A

The use of unauthorized access points in an enterprise environment may pose a challenge to enterprise IT due to security concerns and interference with corporate deployed WiFi networks. This challenge may further be exacerbated by the advent of access point functionality built into employee mobile Smartphones.

This disclosure describes a method to prevent employees from operating the access point functionality on their handsets within coverage of the enterprise WiFi network. The method may be comprised of the following elements:

1) Ability to centrally administer employee handsets with a list of "blocked" SSIDs and whether these SSIDs broadcast their SSIDs
2) Employee handsets will be prevented from choosing one of the "blocked" SSIDs as the name for their mobile access point. In this way, employees will not be able to "spoof" others into believing that they are selecting and connecting to their enterprise WiFi network.
3) Employee handsets may be prevented from turning on mobile access point functionality when in the presence of one of the "blocked" SSIDs. This may accomplished by performing passive and/or active scans (active scanning is required to locate SSIDs that don't broadcast their SSID) to determine whether the device is in the presence of any of the "blocked" SSIDs. In this way, employees will not be able to enable access point mode on their handsets and interfere with the corporate WiFi network.
4) Employee handsets may be forced to turn off mobile hotspot functionality when they enter the presence of one of the "blocked" SSIDs. This may be accomplished by:
    a. Ability to centrally administer employee handsets with a list of channels that are used by the corporate WiFi network. For example, in the 2.4GHz band, enterprises typically deploy their enterprise APs on channels 1, 6 and 11 in an interleaved fashion.
    b. Handset constrains operation of mobile hotspot to use the same channels as the enterprise network. This may seem counter-intuitive, but in fact, it's the only way to ensure that the mobile handset can detect the presence of an enterprise network since once it enters access point mode, it may no longer be able to leave the current channel it is using in order to scan and detect the presence of enterprise SSIDs on other channels.
    c. While the handset is in access point mode, it will perform same-channel passive and/or active scans to determine whether the device is in the presence of any of the "blocked" SSIDs.
    d. If it is in the presence of a blocked SSID, the handset will immediately disable access point functionality on the handset.

What is claimed is:

1. A mobile communication device operable as a mobile wireless access point and comprising a processor and a memory, the mobile communication device operable to:
    receive a precluded WLAN identifier; receive a permissible channel that identifies a channel that is available for use by the mobile communication device for mobility wireless access point functionality;
    select the permissible channel as a selected channel; monitor the selected channel for the precluded WLAN identifier; and
    upon detection of the precluded WLAN identifier, prevent a mobile wireless access point from using the precluded WLAN identifier.

2. The mobile communication device of claim 1, wherein:
    receiving the permissible channel comprises receiving a set of permissible channels; and
    selecting the selected channel comprises selecting one of the set of permissible channels as the selected channel.

3. The mobile communication device of claim 2, wherein selecting is based, at least in part, on the identity of a channel on which the mobile wireless access point is already configured to operate.

4. The mobile communication device of claim 1 wherein said preventing the mobile wireless access point at the mobile communication device from using the WLAN identifier comprises disabling the mobile wireless access point.

5. The mobile communication device of claim 1 wherein said preventing the mobile wireless access point at the mobile communication device from using the WLAN identifier comprises requiring the mobile wireless access point to use a different WLAN identifier.

6. The mobile communication device of claim 1 wherein said monitoring of the selected channel is conditional upon a determination that the mobile communication device is in motion.

7. The mobile communication device of claim 1 wherein said monitoring of the selected channel is conditional upon a determination that the mobile communication device is presently situated in a geographical location that is known to be proximate to the WLAN.

8. The mobile communication device of claim 1 further comprising, prior to the monitoring, configuring the mobile wireless access point functionality to operate using the selected channel.

9. The mobile communication device of claim 1, wherein monitoring comprising monitoring only the selected channel for the precluded WLAN.

10. A method of operating a mobile communication device operable as a mobile wireless access point, the method comprising:
- receiving a precluded WLAN identifier;
- receiving a permissible channel that identifies a channel that is available for use by the mobile communication device for mobility wireless access point functionality;
- selecting the permissible channel as a selected channel;
- monitoring the selected channel for the precluded WLAN identifier; and
- upon detection of the precluded WLAN identifier, preventing a mobile wireless access point from using the precluded WLAN identifier.

11. The method of claim 10, wherein:
- receiving the permissible channel comprises receiving a set of permissible channels; and
- selecting the selected channel comprises selecting one of the set of permissible channels as the selected channel.

12. The method of claim 11, wherein selecting is based, at least in part, on the identity of a channel on which the mobile wireless access point is already configured to operate.

13. The method of claim 10 wherein said preventing the mobile wireless access point at the mobile communication device from using the WLAN identifier comprises disabling the mobile wireless access point.

14. The method of claim 10 wherein said preventing the mobile wireless access point at the mobile communication device from using the WLAN identifier comprises requiring the mobile wireless access point to use a different WLAN identifier.

15. The method of claim 10 wherein said monitoring of the selected channel is conditional upon a determination that the mobile communication device is in motion.

16. The method of claim 10 wherein said monitoring of the selected channel is conditional upon a determination that the mobile communication device is presently situated in a geographical location that is known to be proximate to the WLAN.

17. The method of claim 10 further comprising, prior to the monitoring, configuring the mobile wireless access point functionality to operate using the selected channel.

18. The method of claim 10, wherein monitoring comprising monitoring only the selected channel for the precluded WLAN.

19. A non-transitory machine-readable medium storing software that, upon execution by a processor of a mobile communication device that is operable as a mobile wireless access point, causes the mobile communication device to:
- receive a precluded WLAN identifier;
- receive a permissible channel that identifies a channel that is available for use by the mobile communication device for mobility wireless access point functionality;
- select the permissible channel as a selected channel;
- monitor the selected channel for the precluded WLAN identifier; and
- upon detection of the precluded WLAN identifier, prevent a mobile wireless access point from using the precluded WLAN identifier.

20. A system for promoting network security in a wireless local area network (WLAN) comprising multiple WLAN cells, each WLAN cell comprising a wireless access point, the system comprising:
- A mobile communication device operable as a mobile wireless access point, the mobile communication device operable to:
  - receive a precluded WLAN identifier;
  - receive a permissible channel that identifies a channel that is available for use by the mobile communication device for mobility wireless access point functionality;
  - select the permissible channel as a selected channel;
  - monitor the selected channel for the precluded WLAN identifier; and
  - upon detection of the precluded WLAN identifier, prevent a mobile wireless access point from using the precluded WLAN identifier.

\* \* \* \* \*